United States Patent [19]

Pelrine

[11] 4,259,306

[45] Mar. 31, 1981

[54] SYNTHESIS OF ZSM-39

[75] Inventor: Bruce P. Pelrine, Trenton, N.J.

[73] Assignee: Mobile Oil Corporation, Fairfax, Va.

[21] Appl. No.: 156,906

[22] Filed: Jun. 6, 1980

Related U.S. Application Data

[63] Continuation-in-part of Ser. No. 84,684, Oct. 15, 1979.

[51] Int. Cl.$^3$ ............... C01B 33/00; C01B 33/20; C01B 33/28
[52] U.S. Cl. ............... 423/325; 423/326; 423/327; 423/328; 423/329; 423/335; 252/455 Z
[58] Field of Search ............... 423/325–330, 423/335; 252/431 N, 455 Z; 260/326.61, 326.8, 448 C

[56] References Cited

U.S. PATENT DOCUMENTS

| 4,016,245 | 4/1977 | Plank et al. | 423/328 |
| 4,076,842 | 2/1978 | Plank et al. | 423/328 |
| 4,100,262 | 7/1978 | Pelrine | 423/329 |
| 4,108,881 | 8/1978 | Rollmann et al. | 260/448 C |

*Primary Examiner*—Edward J. Meros
*Attorney, Agent, or Firm*—Charles A. Huggett; Charles J. Speciale

[57] ABSTRACT

A new and useful method for preparing synthetic zeolite ZSM-39 is provided. This new method comprises synthesizing zeolite ZSM-39 in the presence of pyrrolidine as a template rather than the template of a tetraethylammonium cation or n-propylamine.

9 Claims, No Drawings

SYNTHESIS OF ZSM-39

CROSS-REFERENCE TO RELATED APPLICATIONS

This application is a continuation-in-part of application Ser. No. 084,684, filed Oct. 15, 1979.

BACKGROUND OF THE INVENTION

1. Field of the Invention

This invention relates generally to a new method of preparing a crystalline zeolite material and particularly to a new method of making substantially pure zeolite ZSM-39 by utilizing a tetraureacobalt (II) complex and pyrrolidine.

2. Description of the Prior Art

Zeolitic materials, both natural and synthetic, have been demonstrated in the past to have catalytic properties for various types of hydrocarbon conversions. Certain zeolitic materials are ordered, porous crystalline aluminosilicates having a definite crystalline structure within which there are a large number of channels. These cavities and channels are precisely uniform in size. Since lthe dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline aluminosilicates. These aluminosilicates can be described as a rigid three-dimensional framework of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as $Ca/2$, $Sr/2$, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate by suitable selection of the cation. The spaces between the tetrahedra are occupied by molecules of water prior to dehydration.

Prior art techniques have resulted in the formation of a great variety of synthetic aluminosilicates. These aluminosilicates have come to be designated by letter or other convenient symbols, as illustrated by zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752) zeolite ZSM-5 (U.S. Pat. No. 3,702,886), zeolite ZSM-11 (U.S. Pat. No. 3,709,979), zeolite ZSM-12 (U.S. Pat. No. 3,832,449) and zeolite ZSM-20 (U.S. Pat. No. 3,972,983), ZSM-23 (U.S. Pat. No. 4,076,842), ZSM-35 (U.S. Pat. No. 4,016,245), ZSM-38 (U.S. Pat. No. 4,046,859), merely to name a few. The preparation of ZSM-5 utilizing a tetraureacobalt (II) complex is described in U.S. Pat. No. 4,100,262.

Zeolite ZSM-39 and its preparation are taught by copending U.S. patent application Ser. No. 084,684 filed Oct. 15, 1979, now abandoned. In this preparation of ZSM-39, the template employed for the synthesis is generally a tetraethylammonium cation or n-propylammine. It has a distinctive X-ray diffraction pattern which identifies it from other known zeolites.

SUMMARY OF THE INVENTION

The present invention relates to an improved method of preparing synthetic crystalline zeolite designated as "zeolite ZSM-39" or simply "ZSM-39". The porous zeolite composition ZSM-39 can be identified, in terms of moles of anhydrous oxides per 100 moles of silica as follows: $(0-2.5)M_2/nO:(0-2.5)Al_2O_3:100\ SiO_2$ wherein M is at least one cation having a valence n, and wherein the zeolite is characterized by the distinctive X-ray diffraction pattern as shown in Table I herein.

In the as synthesized form, the zeolite has a formula, after dehydration, in terms of mole ratios of oxides per 100 moles of silica as follows: $(0-2.5)R_2O: (0-2.5)M_2/nO:(0-2.5)Al_2O_3:100SiO_2$ wherein R is an aryl ammonium compound and M is an alkali or alkaline earth metal cation, especially sodium.

ZSM-39 possesses a definite distinguishing crystalline structure whose X-ray diffraction pattern has the following characteristic lines:

TABLE I

| Interplanar Spacing, d(Å) | Relative Intensity |
|---|---|
| 11.2 ± 0.2 | W |
| 6.8 ± 0.15 | M |
| 5.8 ± 0.1 | VS |
| 5.6 ± 0.1 | VS |
| 4.8 ± 0.1 | M |
| 4.4 ± 0.1 | M |
| 3.95 ± 0.08 | M-S |
| 3.7 ± 0.08 | VS |
| 3.4 ± 0.07 | M-S |
| 3.3 ± 0.07 | VS |
| 3.2 ± 0.07 | W |
| 3.1 ± 0.06 | W |
| 3.0 ± 0.06 | W |
| 2.3 ± 0.05 | W |

These values were determined by standard technique. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these, the relative intensities, 100 I/Io, where Io is the intensity of the strongest line or peak, and d (obs.) the interplanar spacing in A, corresponding to the recorded lines, were calculated. In Table I the relative intensities are given in terms of the symbols W=weak, M=medium, M-S=medium-strong, S=strong and VS=very strong.

It should be understood that this X-ray diffraction pattern is characteristic of all the species of ZSM-39 zeolites. Ion exchange of the sodium ion with cations reveals substantially the same pattern with some minor shifts in interplanar spacing and variation in relative intensity. Other minor variations can occur depending on the silicon to aluminum mole ratio of the particular sample, as well as if it has been subjected to thermal treatment.

Zeolite ZSM-39 in accord with the invention is prepared from a solution containing sources of an alkali metal oxide, preferably sodium oxide, pyrrolidine, tetraureacobalt (II) complex, an oxide of silicon, water, and with or without an oxide of aluminum. The reaction mixture has the following composition expressed in terms of mole ratios of oxides, falling within the following ranges:

|  | BROAD | PREFERRED |
|---|---|---|
| $SiO_2/Al_2O_3$ | 5–infinity | 40–2000 |
| $H_2O/SiO_2$ | 1–3000 | 10–500 |
| $OH^-/SiO_2$ | 0.001–10 | 0.005–5 |
| $M/SiO_2$ | 0.01–3 | 0.01–1 |
| $R/SiO_2$ | 0.01–5 | 0.01–3 |
| $R'/SiO_2$ | 0.005–2 | 0.01–1 | wherein R is pyrrolidine, R' is tetraureacobalt (II) complex, such as for example tetraureacobalt (II) nitrate and M is an alkali metal cation, and maintaining the mixture until crystals of the zeolite are formed. Thereafter, the crystals are separated from the liquid and recovered. Typical reaction conditions consist of heating the foregoing reaction mixture to a temperature of from about 25° C. to about 250° C. for a period of time of from about 2 days to about 25 days. A more preferred temperature range is from about 100° C. to about 175° C. with the amount of time at a temperature in such range being from about 5 days to about 10 days.

The digestion of the gel particles is carried out until crystals form. The solid product is separated from the reaction medium, as by cooling the whole to room temperature, filtering and water washing.

The crystalline product is dried, e.g. at a temperature of about 120° C. for about 4 hours. Of course, milder conditions may be employed if desired, e.g. room temperature under vacuum.

The composition for the synthesis of synthetic ZSM-39 can be prepared utilizing materials which can supply the appropriate oxide. Such materials include aluminates, alumina, silicates, silica, hydrosol, silica gel, silicic acid, and hydroxides. It will be understood that each oxide component utilized in the reaction mixture for preparing ZSM-39 can be supplied by one or more essential reactants and they can be mixed together in any order. For example, any oxide can be supplied by an aqueous solution, sodium hydroxide or by an aqueous solution of a suitable silicate; the cation can be supplied by a compound of that cation, such as, for example, a salt. The tetraureacobalt (II) complex can be supplied by an appropriate compound such as the nitrate, nitrite, sulfate, hydroxide, halide or the like, thereof. Crystallization time of the new crystal form ZSM-39 will vary with the nature of the reaction mixture employed.

It is postulated that the synthesis of ZSM-39 in accordance with this invention may result in the formulation of a new composition for ZSM-39 with cobalt in the lattice structure. At this point in time, however, it would be very difficult to detect the presence of cobalt in the zeolite structure.

DESCRIPTION OF SPECIFIC EMBODIMENTS

The presently prepared new crystal form ZSM-39 can be utilized as catalytic material for a number of hydrocarbon conversion reactions substantially as synthesized or the original cations of the as synthesized ZSM-39 can be replaced in accordance with techniques well known in the art, at least in part, by ion exchange with other cations. When used as synthesized, the zeolite is preferably heated to a temperature within the range of from 65° F. to about 815° F. for a period of time ranging from about 1 hour to about 48 hours or more. Preferred replacing cations include metal ions, ammonium ions, hydrogen ions and mixtures thereof. Particularly preferred cations are those which render the zeolite catalytically active especially for hydrocarbon conversion. These include hydrogen, rare earth metals, aluminum, metals of Groups IIA, IIIA, IVA, VIA, VIII, IB, IIB, IIIB, and IVB. Of the replacing metallic cations, particular preference is given to cations of metals such as rare earth, Mn, Ca, Mg, Zn, Cd, Pd, Ni, Cu, Ti, Al, Sn, Fe and Co.

A typical ion exchange technique would be to contact the synthetic ZSM-39 zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 65° F. to about 315° F. and thereafter may be calcined in air or other inert gas at temperatures ranging from about 480° F. to 650° F. for periods of time ranging from 1 to 48 hours or more to produce a catalytically-active thermal decomposition product thereof.

Regardless of the cation replacing the ctions in the synthesized form of the ZSM-39 the spatial arrangement of the aluminum, silicon and oxygen atoms which generally form the basic crystal lattices of the new crystal form ZSM-39 remains essentially unchanged by the described replacement of the original cations as determined by taking an X-ray powder diffraction pattern of the ion-exchanged material.

Synthetic ZSM-39 zeolites prepared in accordance hereto can be used either in the organic cation or alkali metal form and hydrogen form or another univalent of multivalent cationic form. They can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to ZSM-39 such as, for example, by, in the case of platinum, treating the zeolite with a platinum metal-containing ion. thus, suitable platinum compounds for this purpose include chloroplatinic acid, platinous chloride and various compounds containing the platinum amine complex. Combinations of metals and methods for their introduction can also be used.

ZSM-39 prepared by the instant invention, being composed of very uniformly sized crystals, may be formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the aluminosilicate can be extruded before drying or dried partially and then extruded.

In the case of many catalysts, it is desired to incorporate the ZSM-39 hereby prepared with another material resistant to the temperatures and other conditions employed in organic conversion processes. Such matrix materials include active and inactive materials and synthetic or naturally occurring zeolites s well as inorganic materials such as clays, silica and/or metal oxides. The latter may be either naturally occurring or in the form of gelatinous precipitates, sols or gels including mixtures of silica and metal oxides. Use of a material in conjunction with the ZSM-39 i.e. combined therewith, which is active, tends to improve the conversion and/or selectivity of the catalyst in certain organic conversion processes. Inactive materials suitably serve as diluents to control the amount of conversion in a given process so that products can be obtained economically and orderly without employing other means for controlling the rate of reaction. Frequently, zeolite materials have been incorporated into naturally occurring clays, e.g., bentonite and kaolin. These materials, i.e., clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized ZSM-39 catalyst include the montmorillonite and kaolin family, which families include the sub-bentonites, and the kaolins commonly known as Dixie, McNammee, Georgia and Florida clays or others in which the main mineral constituent is halloysite, kaolinite, dickite, nacrite, or anauxite. Such clays can be used in the raw state or initially subjected to calcination, acid treatment or chemical modification.

In addition to the foregoing materials, the ZSM-39 catalyst hereby synthesized can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline aluminosilicate ZSM-39 and inorganic oxide gel matrix vary widely with the crystalline aluminosilicate content ranging from about 1 to about 90 percent by weight and more usually in the range of about 2 to about 50 percent by weight of the composite.

In order to more fully illustrate the nature of the invention and the manner of practicing same, the following examples are presented. These examples are not to be considered limiting, as would be realized by one of ordinary skill in the art.

EXAMPLE 1

A solution was prepared containing 10.0 grams of tetraureacobalt (II) nitrate, 160 grams of Mc/B Colloidal Silica (30% $SiO_2$), manufactured by Matheson, Coleman and Bell, 1.7 grams of $NaAl_2O_3$ (40% $Al_2O_3$, 33% $Na_2O$, 27% $H_2O$), 17.1 grams of pyrrolidine and 52 grams of water. All the above ingredients, except for the silica, were combined and heated to about 50° C. with stirring, then mixed with the silica. The resulting gel was placed in a stirred autoclave and heated for over four hours at 160° C. This temperature was maintained for nine days at 90 RPM. The temperature was the elevated to 210° C. for 5 days at 90 RPM.

The product of this example, weighting 53.3 grams, was filtered, washed and dried. It was then calcined in helium at 540° F., overnight. The product was then air calcined at 540° F. An exchange with 4 M $NH_4Cl$ was attempted twice at reflux conditions. The synthesis product was identified as ZSM-39 whose elemental analysis was:

$Al_2O_3 = 0.88\%$
$SiO_2 = 91.35\%$
$Na = 0.02\%$
$SiO_2/Al_2O_3 = 176.5$

The X-ray diffraction pattern in Table I was derived from the zeolite produced in this example.

EXAMPLE 2

The product of Example 1 was contacted with n-hexane at 60 mm at 20° C. The sorption of n-hexane at these conditions was 0.4%.

EXAMPLE 3

The same gel formulation of Example 1, except that 7.0 grams of NaCl was added, was used in this example. This formulation was run at 160° C. for 3 days in a stirred autoclave at 90 RPM. The resulting product was identified by its X-ray diffraction pattern as being ZSM-39, and is shown in Table I herein.

EXAMPLE 4

The product of Example 3 was contacted with n-hexane at 60 mm and 20° C. The sorption of n-hexane at these conditions was 0.8%.

EXAMPLE 5

The same formulation as Example 3 was run at 160° C. for 7 days at 90 RPM. The resultant product was ZSM-39.

EXAMPLE 6

The product of Example 3 was calcined at 1100° 'C. for about 1 hour. The zeolite lost only about 35% of its crystallinity after this calcination, thus demonstrating its extremely high thermal stability.

What is claimed is:

1. A method for synthesizing crystalline zeolite ZSM-39 which has the composition expressed in terms of mole ratios of oxides in the anhydrous state as follows: $(0-2.5)M_2/nO: (0-2.5)Al_2O_3: 100\ SiO_2$ wherein M is at least one cation having a valence n, said zeolite being characterized by the X-ray diffraction pattern as set out in Table I herein, which comprises the steps of a. preparing a reaction mixture comprising sources of alkali metal oxide, an oxide of silicon, water, pyrrolidine, and a tetraureacobalt (II) complex and having a composition, in terms of mole ratios of oxides, falling within the following ranges:

$SiO_2/Al_2O_3 = 5$–infinity
   $H_2O/SiO_2 = 1$–3000
   $OH^-/SiO_2 = 0.001$–10
   $M/SiO_2 = 0.01$–3
   $R/SiO_2 = 0.01$–5
   $R'/SiO_2 = 0.005$–2 wherein M is an alkali or alkaline earth metal cation, R is pyrrolidine and R' is a tetraureacobalt (II) cation, and b. maintaining said mixture at a temperature of from between about 25° C. and about 250° C. until crystals of said zeolite are formed.

2. The method of claim 1 wherein the mixture has a composition, in terms of mole ratios of oxides, falling within the following ranges:

$SiO_2/Al_2O_3 = 40$–2000
   $H_2O/SiO_2 = 10$–500
   $OH-/SiO_2 = 0.005$–5

M/SiO$_2$ = 0.01-1
R/SiO$_2$ = 0.01-3
R'/SiO$_2$ = 0.01-1

3. The method of claim 1 wherein said temperature is maintained from between about 100° C. and about 175° C.

4. The method of claim 1 wherein said tetraureacobalt (II) complex is tetraureacobalt (II) nitrate.

5. The method of claim 1 wherein said alkali metal ion is a sodium ion.

6. The method of claim 1 which comprises the further step of calcining said zeolite at a temperature of from between about 480° C. and about 650° C.

7. The method of claim 1 which comprises the further step of replacing, at least in part, the original cations of said zeolite by ion exchange with a cation or a mixture of cations selected from the group consisting of hydrogen and hydrogen precursors, rare earth metals, and metals from Groups IIA, IIIA, IVA, IB, IIB, IIIB, IVB, VIA and VIII of the Periodic Chart of the Elements.

8. The method of claim 1 wherein the reaction mixture further comprises a source of aluminum oxide.

9. The method of claim 1 wherein the reaction mixture is prepared in the absence of added aluminum oxide.

* * * * *

UNITED STATES PATENT AND TRADEMARK OFFICE
CERTIFICATE OF CORRECTION

PATENT NO.   :   4,259,306
DATED        :   March 31, 1981
INVENTOR(S)  :   Bruce Patrick Pelrine It is certified that error appears in the above-identified patent and that said Letters Patent are hereby corrected as shown below:

Column 1, line 66, delete "084,684" and insert -- 084,683 --.

Column 4, line 22, delete "480°F to 650°F" and insert -- 480°C to 650°C --.

Column 5, lines 66-67, delete "540°F" and insert -- 540°C --.

Signed and Sealed this

Twelfth Day of January 1982

[SEAL]

Attest:

Attesting Officer

GERALD J. MOSSINGHOFF

Commissioner of Patents and Trademarks